(12) United States Patent
McCarthy et al.

(10) Patent No.: US 12,505,208 B2
(45) Date of Patent: Dec. 23, 2025

(54) INTEGRATED CYBERSECURITY THREAT MANAGEMENT

(71) Applicant: Arctic Wolf Networks, Inc., Eden Prairie, MN (US)

(72) Inventors: Joshua McCarthy, Morgan Hill, CA (US); Romans Bermans, Cadiz (ES); David B McKinley, Dartmouth, MA (US)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 488 days.

(21) Appl. No.: 17/976,924

(22) Filed: Oct. 31, 2022

(65) Prior Publication Data

US 2023/0068946 A1 Mar. 2, 2023

Related U.S. Application Data

(63) Continuation-in-part of application No. 17/825,024, filed on May 26, 2022.

(Continued)

(51) Int. Cl.
G06F 21/55 (2013.01)

(52) U.S. Cl.
CPC ...... *G06F 21/554* (2013.01); *G06F 2221/034* (2013.01)

(58) Field of Classification Search
CPC .......... G06F 21/554; G06F 2221/034
See application file for complete search history.

(56) References Cited

U.S. PATENT DOCUMENTS 8,392,218 B2 3/2013 Becker et al.
10,250,619 B1 * 4/2019 Park ........................ H04L 63/18
(Continued)

FOREIGN PATENT DOCUMENTS

KR 10-2020-0083874 A 7/2020

OTHER PUBLICATIONS

Robiah, Y. & Selamat, Siti Rahayu & Sahib, Shahrin. (2008). Intrusion Alert Correlation Technique Analysis for Heterogeneous Log. International Journal of Computer Science and Network Security. vol. 8, No. 9, Sep. 2008. pp. 132-138 (Year: 2008).*

(Continued)

*Primary Examiner* — Thomas A Gyorfi
(74) *Attorney, Agent, or Firm* — Barnes & Thornburg LLP

(57) ABSTRACT

Disclosed techniques include integrated cybersecurity threat management. A plurality of network-connected cybersecurity threat protection applications is accessed. A plurality of heterogeneous log files is ingested, wherein the log files are generated by at least two of the cybersecurity threat protection applications. The plurality of heterogeneous log files that were ingested is evaluated to enable identification of cybersecurity threat protection application capabilities. Each of the plurality of log files is sorted. The sorting enables identification of cybersecurity threat protection elements among the plurality of log files. The cybersecurity threat protection elements that were identified are integrated. The integrated cybersecurity threat protection elements are evaluated. At least one response for cybersecurity threat management is generated, based on a result of the evaluating. The response is provided to a cybersecurity threat management entity. The cybersecurity threat management entity is a security orchestration automation and response application.

26 Claims, 9 Drawing Sheets

Related U.S. Application Data

(60) Provisional application No. 63/404,983, filed on Sep. 9, 2022, provisional application No. 63/350,891, filed on Jun. 10, 2022, provisional application No. 63/327,853, filed on Apr. 6, 2022, provisional application No. 63/297,273, filed on Jan. 7, 2022, provisional application No. 63/274,302, filed on Nov. 1, 2021, provisional application No. 63/234,729, filed on Aug. 19, 2021, provisional application No. 63/193,615, filed on May 27, 2021.

(56) References Cited

U.S. PATENT DOCUMENTS

| | | |
|---|---|---|
| 10,394,802 B1 * | 8/2019 | Porath ............ G06F 16/906 |
| 10,534,971 B2 | 1/2020 | Huber, Jr. et al. |
| 10,621,172 B2 | 4/2020 | Azaria et al. |
| 10,776,316 B2 | 9/2020 | Baggeroer et al. |
| 10,838,709 B2 | 11/2020 | Eapen et al. |
| 10,901,863 B2 | 1/2021 | Lukkoor et al. |
| 10,922,452 B2 | 2/2021 | Liu et al. |
| 10,924,527 B2 | 2/2021 | Miller |
| 10,936,234 B2 | 3/2021 | Su |
| 10,938,706 B1 | 3/2021 | Zacks et al. |
| 10,938,951 B2 | 3/2021 | White et al. |
| 10,956,880 B2 | 3/2021 | Towle |
| 11,714,823 B1 * | 8/2023 | Breeden ............ G06F 16/24556 707/602 |
| 2013/0318542 A1 | 11/2013 | Zamora |
| 2015/0026810 A1 | 1/2015 | Friedrichs et al. |
| 2015/0156213 A1 * | 6/2015 | Baker ............ H04L 63/1416 726/23 |
| 2018/0121316 A1 | 5/2018 | Ismael et al. |
| 2020/0244412 A1 | 7/2020 | Kalhan |
| 2020/0280443 A1 | 9/2020 | Simons |
| 2020/0305011 A1 | 9/2020 | Yaniv et al. |
| 2020/0342552 A1 | 10/2020 | Sulit et al. |
| 2020/0363781 A1 | 11/2020 | Mangels et al. |
| 2020/0380006 A1 | 12/2020 | Rockwell et al. |
| 2021/0014153 A1 | 1/2021 | Amend et al. |
| 2021/0042589 A1 | 2/2021 | Tokarev Sela et al. |
| 2021/0070333 A1 | 3/2021 | Chen |
| 2021/0099420 A1 | 4/2021 | Zhang |
| 2023/0087309 A1 * | 3/2023 | Pietila ............ H04L 63/1425 726/23 |

OTHER PUBLICATIONS

Ning, Xia, Geoff Jiang, Haifeng Chen and Kenji Yoshihira. "HLAer : a System for Heterogeneous Log Analysis." (22 pages) https://www.semanticscholar.org/paper/HLAer-%3A-a-System-for-Heterogeneous-Log-Analysis-Ning-Jiang/236d9c76dbaa6e2e07ef6d17a8f3cc4fac6e1e55. (Year: 2013).*

Sangani, Nilaykumar Kiran, and Haroot Zarger. "Machine learning in application security." Advances in Security in Computing and Communications. IntechOpen, 2017.

Boutaba, Raouf, et al. "A comprehensive survey on maching learning for networking: evolution, applications and research opportunities." Journal of Internet Services and Applications 9.1 (2018): 1-99.

International Search Report dated Aug. 31, 2022 for PCT 2022/031003.

* cited by examiner

| EVENT NAME 410 | LOG SOURCE 412 | EVENT COUNT 414 | TIME 416 | LOW LEVEL CATEGORY 418 | SOURCE IP 420 | source PORT 422 | DESTINATION IP 424 | DESTINATION PORT 426 | USERNAME 428 | MAGNITUDE 430 |
|---|---|---|---|---|---|---|---|---|---|---|
| API REQUEST SUCCESSFUL | SIM AUDIT-2 :: LOCALHOST | 1 | 9/27/21, 11:25:00 | SIM USER ACTION | 10.4.0.251 | 0 | 10.20.2.11 | 0 | USER-A | R:442 |
| SEARCH COMPLETED | SIM AUDIT-2 :: LOCALHOST | 1 | 9/27/21, 11:25:00 | SIM USER ACTION | 127.0.0.1 | 0 | 10.20.2.11 | 0 | N/A | R:342 |
| API REQUEST SUCCESSFUL | SIM AUDIT-2 :: LOCALHOST | 1 | 9/27/21, 11:25:00 | SIM USER ACTION | 10.4.0.251 | 0 | 10.20.2.11 | 0 | USER-A | R:442 |
| API REQUEST SUCCESSFUL | SIM AUDIT-2 :: LOCALHOST | 1 | 9/27/21, 11:25:00 | SIM USER ACTION | 10.4.0.251 | 0 | 10.20.2.11 | 0 | USER-A | R:442 |
| API REQUEST SUCCESSFUL | SIM AUDIT-2 :: LOCALHOST | 1 | 9/27/21, 11:25:00 | SIM USER ACTION | 10.4.0.251 | 0 | 10.20.2.11 | 0 | USER-A | R:442 |
| SEARCH EXECUTED | SIM AUDIT-2 :: LOCALHOST | 1 | 9/27/21, 11:25:00 | SIM USER ACTION | 127.0.0.1 | 0 | 10.20.2.11 | 0 | N/A | R:342 |
| INFO MESSAGE | SYS NOT-2 :: LOCALHOST | 1 | 9/27/21, 11:25:00 | INFORMATION | 127.0.0.1 | 0 | 127.0.0.1 | 0 | N/A | Y:2, R:2 |
| API REQUEST SUCCESSFUL | SIM AUDIT-2 :: LOCALHOST | 1 | 9/27/21, 11:25:00 | SIM USER ACTION | 10.4.0.251 | 0 | 10.20.2.11 | 0 | USER-B | R:442 |
| INFO MESSAGE | SYS NOT-2 :: LOCALHOST | 1 | 9/27/21, 11:25:00 | INFORMATION | 127.0.0.1 | 0 | 127.0.0.1 | 0 | N/A | Y:2, R:2 |
| INFO MESSAGE | SYS NOT-2 :: LOCALHOST | 1 | 9/27/21, 11:25:00 | INFORMATION | 127.0.0.1 | 0 | 127.0.0.1 | 0 | N/A | Y:2, R:2 |
| INFO MESSAGE | SYS NOT-2 :: LOCALHOST | 1 | 9/27/21, 11:25:00 | INFORMATION | 127.0.0.1 | 0 | 127.0.0.1 | 0 | N/A | Y:2, R:2 |
| INFO MESSAGE | SYS NOT-2 :: LOCALHOST | 1 | 9/27/21, 11:25:00 | INFORMATION | 127.0.0.1 | 0 | 127.0.0.1 | 0 | N/A | Y:2, R:2 |
| API REQUEST SUCCESSFUL | SIM AUDIT-2 :: LOCALHOST | 1 | 9/27/21, 11:25:00 | INFORMATION | 127.0.0.1 | 0 | 127.0.0.1 | 0 | N/A | Y:2, R:2 |

FIG. 4

| INTEGRATION NAME 510 | STATUS 512 | ACTION(S) 514 |
|---|---|---|
| ORCHESTRATOR | CONNECTED | EDIT / DELETE |
| EMAIL SENDER | CONNECTED | EDIT / DELETE |
| EMAIL IMAP MONITOR 1 | CONNECTED | EDIT / DELETE |
| VIRUS TOTAL | CONNECTED | EDIT / DELETE |
| PRODUCTIVITY TOOLS INTEGRATION | CONNECTED | EDIT / DELETE |
| CLOUD-BASED INFO SECURITY INTEGRATION | DISCONNECTED | EDIT / DELETE |
| SERVER SEARCH ENGINE INTEGRATION | CONNECTED | EDIT / DELETE |
| FRONT OFFICE SUITE INTEGRATION | DISCONNECTED | EDIT / DELETE |
| MALWARE PROTECTION INTEGRATION | DISCONNECTED | EDIT / DELETE |
| RESILIENCE INTEGRATION | CONNECTED | EDIT / DELETE |
| EMAIL IMAP MONITOR 2 | DISCONNECTED | EDIT / DELETE |
| SIEM 1 INTEGRATION | CONNECTED | EDIT / DELETE |

FIG. 5

INTEGRATED CYBERSECURITY THREAT MANAGEMENT

RELATED APPLICATIONS

This application claims the benefit of U.S. provisional patent applications "Integrated Cybersecurity Threat Management" Ser. No. 63/274,302, filed Nov. 1, 2021, "Cybersecurity State Change Buffer Service" Ser. No. 63/297,273, filed Jan. 7, 2022, "Cybersecurity Workflow Management Using Autodetection" Ser. No. 63/327,853, filed Apr. 6, 2022, "Cybersecurity Operations Center Load Balancing" Ser. No. 63/350,891, filed Jun. 10, 2022, and "Cybersecurity Operations Case Triage Groupings" Ser. No. 63/404,983, filed Sep. 9, 2022.

This application is also a continuation-in-part of U.S. patent application "Cybersecurity Threat Management Using Element Mapping" Ser. No. 17/825,024, filed May 26, 2022, which claims the benefit of U.S. provisional patent applications "Cybersecurity Threat Management Using Element Mapping" Ser. No. 63/193,615, filed May 27, 2021, "Cybersecurity Threat Management Using Impact Scoring" Ser. No. 63/234,729, filed Aug. 19, 2021, "Integrated Cybersecurity Threat Management" Ser. No. 63/274,302, filed Nov. 1, 2021, "Cybersecurity State Change Buffer Service" Ser. No. 63/297,273, filed Jan. 7, 2022, and "Cybersecurity Workflow Management Using Autodetection" Ser. No. 63/327,853, filed Apr. 6, 2022.

Each of the foregoing applications is hereby incorporated by reference in its entirety.

FIELD OF ART

This application relates generally to cybersecurity management and more particularly to integrated cybersecurity threat management.

BACKGROUND

Since the 1940s, modern societies have used and become increasingly dependent on digital computer systems. At first, many of the advances in computer science and technology were driven by World War II and the need for secure communications. After the war, computers were used to help solve complex mathematical problems and pattern analyses, such as the work on DNA done in the early 1950s. As the advantages gained from digital computers became more apparent, governments and large corporations began to use them for defense projects, network communications, and mass record storage. Tasking computer systems to monitor and control other systems and processes in industries such as manufacturing, energy production, and transportation added to their usefulness. As a result, the quantity and value of the information and programs stored on computer systems multiplied, as did the reliance of governments and private companies on their capabilities. Then, starting in the late 1970s, personal computers entered the marketplace with products being offered from various technology companies, some well-established and others just starting up. Just as governments and corporations did previously, private individuals rapidly increased their use of these systems. Later, cell phones, laptops, and tablets increased the rate at which users added more valuable confidential information and activities to computer systems and networks. Today, digital computers and technology have been incorporated into every facet of our daily lives from food production, storage, transportation, preparation, and consumption to wrist monitors that record our sleep patterns, and recommend and monitor exercise programs to improve our well-being. Transportation, health care, defense, finance, energy, communications, manufacturing, recreation, and many other fields are now saturated with digital computer systems and networks. The data amassed by these computer systems is also routinely analyzed and compared so that the patterns formed by our personal and work lives, both individually and corporately, can be more fully understood and available to be acted upon.

As the value of the data stored on computer systems has grown, the motivation of bad actors to compromise these systems has grown as well. Early generations of computers were only accessible physically to operators who were collocated with input and output devices such as card readers and punches, perforated paper tape units, and keyboard-printers. Physical access was limited to authorized users only. A malefactor had to be onsite to load malicious code; to remove data in the form or cards, tapes, or printouts; or to otherwise compromise the computer systems. Later, data could be maliciously obtained by removing magnetic storage media such as cards and tapes. Unfortunately, requiring onsite access to computers was inconvenient for authorized users. The users had to be onsite at computer installations or "machine rooms" which were cold, drafty, noisy, and potentially lethal due to fire suppression technologies. To improve user access, "remote" terminals were provided. Users could access computers from terminals distributed around an office, school, or hospital, among other enterprises. Computers also could access each other through hardwired and telephonic connections. Increased access for authorized users also increased access to bad actors. Physical connections could be tapped, malicious code could be introduced, or sensitive data could be collected. Today, modern networking technologies enable computer access from virtually any location on earth and beyond. Such access enables authorized users to log into a computer network from the office, coffee shop, airplane, or vacation spot. Negatively, criminals too can attempt access from around the globe, without regard to ownership, jurisdiction, or borders.

SUMMARY

Effective and thorough management of cybersecurity threats is critical to the continuous and reliable computing operations of organizations including businesses, financial institutions, hospitals, government agencies, retailers, universities, and so on. Organizations are painfully aware of these myriad threats, and actively configure and implement state-of-the art best practices to secure their information technology (IT) infrastructure against the threats. While preventative measures such as application and operating system updates, former user deactivation, and other housekeeping activities are critical to IT operations, these measures alone cannot provide universal protection. The cybersecurity threats are constantly evolving and becoming significantly more sophisticated, so constant vigilance and action are required. As soon as a solution is found that identifies, responds to, and eradicates a threat such as a virus; thwarts a Trojan horse program; or detects and deletes a phishing attack; the malefactors behind the threats adapt their techniques by using new attack vectors, advanced social engineering ploys, and other deceptions.

Disclosed techniques enable integrated cybersecurity threat management. A plurality of network-connected cybersecurity threat protection applications is accessed. The cybersecurity threat protection applications can include one or more data management schemas. The plurality of threat protection applications can include cybersecurity threat protection application capabilities. The cybersecurity threat protection application capabilities can incorporate endpoint protection, anti-phishing protection, antivirus protection, firewall protection, man-in-the-middle protection, denial of service protection, distributed denial of service (DDoS) protection, and ransomware protection. A plurality of heterogeneous log files is ingested, wherein the log files are generated by at least two of the plurality of cybersecurity threat protection applications. The log files can include text, numbers, codes, and the like. Each of the plurality of log files is sorted, wherein the sorting enables identification of cybersecurity threat protection elements among the plurality of log files. The cybersecurity threat protection elements can include an element name, a log source, an event count, a time, a low-level category, a source IP address and port, a destination IP address and port, a username, a magnitude, etc. The cybersecurity threat protection elements that were identified can be integrated. Since cybersecurity threat protection applications can provide some but not necessarily all information relevant to a particular threat, the information from the applications can be integrated in order to provide more thorough insight into the threat. The cybersecurity threat protection elements that were integrated are evaluated. The evaluation can be based on a threat level, a priority, a criticality level, a threshold, etc. The evaluation can be based on a range of values, a percentage, and the like. At least one response is generated for cybersecurity threat management, based on a result of the evaluating. The response can include initiating a work plan for determining a source of a threat, isolating affected endpoint and IT devices, remedying the threat, etc.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 4 illustrates a sample log file.

FIG. 5 shows sample integration configuration.

DETAILED DESCRIPTION

Figure 1:
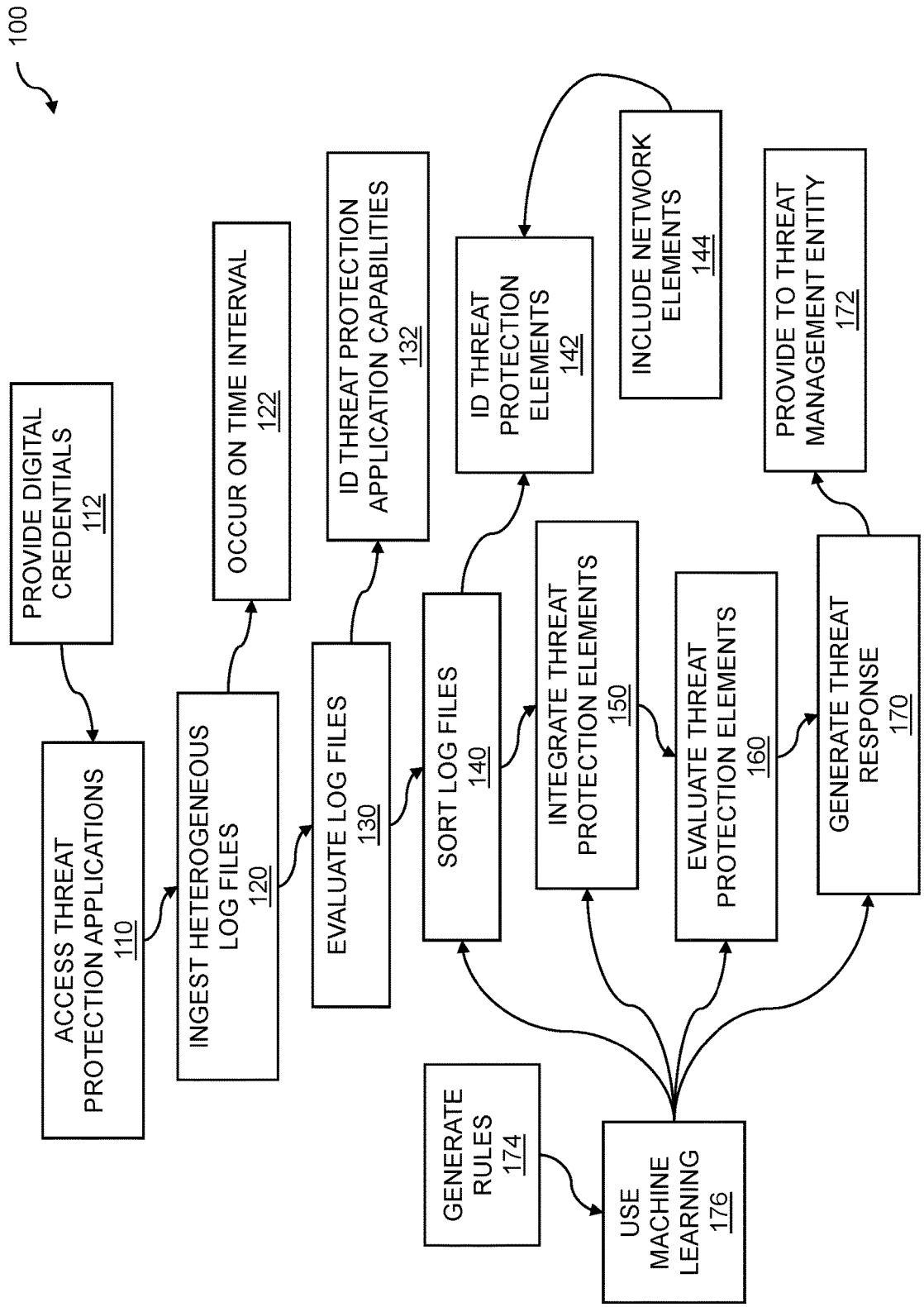
FIG. 1 is a flow diagram for integrated cybersecurity threat management.

Malefactors, both foreign and domestic, mount constant attacks on the information technology infrastructures of enterprises large and small. These bad actors routinely include criminals and organized crime, government sponsored and endorsed actors, terrorists, and others with pernicious intent. Businesses, retailers, universities, hospitals, research laboratories, government agencies, and other enterprises and organizations are at perpetual risk. Cybersecurity threats such as cyberattacks have been detected to occur as often as every few seconds. Enterprises from sectors such as retail, high technology, and government are by far the most frequently attacked. The "big three" sectors are attacked because of the value of their data and the capability of large financial payouts. Other targets of high value include media companies who are claimed by cyber-attackers to have insulted national leaders, and national infrastructures such as energy grids and fuel pipelines. Further, small businesses and individuals are not immune from cybercriminal attacks. The smaller enterprises and the individuals are targets for quick payouts, even if relatively small, and for identity theft. Infrastructure is attacked because of the potential to cause both huge energy delivery interruptions and financial market chaos. Small enterprises may be willing to pay any amount they can to recover their business data from malefactors who have maliciously encrypted their data. An individual may freely and unwittingly provide usernames and passwords to bank or brokerage accounts or personal information such as telephone numbers, email addresses, physical addresses, age, gender, birthdate, national identification number, and so on to the cybercriminals, not knowing they are doing so. Some or all of the personal information can be used to open bank accounts, obtain credit cards or loans, and perform other actions which can be ruinous to the individual's financial wellbeing, credit score, etc. The individual may also drain their personal savings or run up substantial personal debt to transfer funds to what turns out to be an offshore financial institution, all the while thinking they are aiding a friend or relative in distress.

Enterprises allocate significant resources as they engage in cybersecurity activities. The cybersecurity activities, which include cybersecurity threat management, are designed to counter cybersecurity threats and to protect computing systems, data, and other critical information technology (IT) infrastructure. Each of the cybersecurity activities is pivotal to success in securing IT infrastructure, and to ensuring safe and reliable computing operations of the enterprises. Further critical threat protections that are specific to the particular enterprise or the type of enterprise can be put in place. These latter threat protections can include advanced techniques such as biometric verification, two-factor authentication, coded challenges and responses, encrypted or secured communications channels, and so on. The enterprises can include public and private ones, large, medium, and small, and can include businesses, hospitals, government agencies, research facilities, universities, among many others. The enterprises are painfully aware that cybersecurity best practices are essential to the continued operation of, and likely the survival of, the enterprises. Cybersecurity, when done right, is not only a highly complex set of activities, but also an expensive and ever changing one. The cybersecurity measures taken by the enterprises today may thwart known attack techniques, but the techniques used by cybercriminals are constantly evolving, specifically in attempts to thwart the cybersecurity measures. Nearly as soon as a detection tool is developed for identifying, reacting to, and eradicating a cybersecurity threat such as a virus, a Trojan horse program, a phishing attack, or a denial-of-service attack, the cybercriminals adapt their cyberthreat techniques. This results in an ever-escalating, high stakes cyber-game of cat and mouse. The cyberthreat adaptation includes targeting popular electronic devices, using new attack vectors, improving social engineering ploys, and employing other intentional deceptions. Purported links to naughty and compromising photographs of famous people, earnest promises of shared wealth from displaced nobility, and desperate pleas for help from relatives and friends who are in serious trouble while visiting distant locations are specifically designed by their perpetrators to induce a visceral reaction and to motivate their victims to react quickly and unthinkingly. Other ploys include completely copying the landing page of a website with which the victim is familiar. Unless the victim looks at the web address, she or he would be unaware of the deception until their personal information is stolen or their bank accounts are emptied and transferred to an offshore bank. Further subterfuges include "man-in-the-middle" attacks, where the communications between an unwitting victim and a legitimate website are monitored to harvest personal information, usernames and passwords, etc.

In disclosed techniques, cybersecurity threat management is accomplished using integrated cybersecurity. Network-connected cybersecurity threat protection applications can create log files which contain data associated with normal IT infrastructure operations, anomalous operations, detected cyberattacks, and so on. Further information is critical to quickly determining the extent of a threat, a risk level associated with the threat, a number of devices compromised or attacked by the threat, and so on. By ingesting heterogeneous log files from a plurality of network-connected cybersecurity threat protection applications, and by sorting each of the plurality of log files, identification of cybersecurity threat protection elements is enabled. The threat protection elements can be evaluated and at least one threat response can be generated. A plurality of network-connected cybersecurity threat protection applications is accessed. A plurality of heterogeneous log files is ingested, wherein the log files are generated by at least two of the plurality of cybersecurity threat protection applications. Each of the plurality of log files is sorted, wherein the sorting enables identification of cybersecurity threat protection elements among the plurality of log files. The cybersecurity threat protection elements that were identified are integrated. The cybersecurity threat protection elements that were integrated are evaluated. At least one response for cybersecurity threat management is generated, based on a result of the evaluating.

FIG. 1 is a flow diagram for integrated cybersecurity threat management. Cybersecurity management can be accomplished based on integrated cybersecurity threat management techniques. Log files generated by a variety of network-connected cybersecurity threat protection applications can be ingested. The contents of the log files can be sorted for a variety of cybersecurity threat protection elements that can be related to cybersecurity threats. The information can include an anomalous information technology (IT) infrastructure operation, detected threats and attacks, and so on. The cybersecurity threat protection elements that were identified by sorting can be integrated. The integrating enables cross correlation of threat detection log file data from multiple threat detection applications. The integrated threat protection elements are evaluated, and one or more responses are generated. The flow 100 shows a computer-implemented method for cybersecurity management. The flow 100 includes accessing a plurality of network-connected cybersecurity threat protection applications 110. The threat protection applications can defend computer systems, data systems, data networks, endpoint devices, and so on against various types of malicious cyberattacks. In embodiments, the plurality of cybersecurity threat protection applications can include security information and event management (SIEM) applications. The malicious cyberattacks can include malware attacks, hacking attacks, distributed denial of service attacks (DDoS), person in the middle attacks, and so on. The applications can include antivirus, anti-phishing, and anti-cryptojacking applications, tools for threat hunting and threat intelligence, identity verification, endpoint protection, forensic investigation, incident management, and so on. The plurality of cybersecurity threat protection applications can include data management schemas. A management schema can be based on a security domain which can contain one or more database objects. Access to the one or more database objects can be controlled by granting access privileges to each user or role, where a role can include a user, a manager, an administrator, and so on. In the flow 100, the accessing a plurality of cybersecurity threat protection applications can be enabled by digitally providing credentials 112 to the plurality of cybersecurity threat protection applications. The credentials can include a username and password, a two-factor authentication process, a one-time digital access code, etc.

The flow 100 includes ingesting a plurality of heterogeneous log files 120, wherein the log files are generated by at least two of the plurality of cybersecurity threat protection applications. The log files can include data associated with normal IT infrastructure operations, detected anomalies associated with the IT infrastructure operations, possible threats, detected threats, and so on. In embodiments, the ingesting can be based on a query to the plurality of cybersecurity threat protection applications. The log files can include a variety of data types such as text, numbers, codes, and so on. Log files generated by different cybersecurity threat protection applications can use different nomenclature, codes, representations, etc., to indicate similar threats. In the flow 100, the ingesting occurs on a regular time interval 122. The time interval can be based on a schedule, on real time, on computer time, etc. In embodiments, the regular time interval can default to 60 seconds. A balance between the length of the time intervals and the resulting size of log files can be determined. In embodiments, the regular time interval can be user configurable. In embodiments, the ingesting can occur on a cybersecurity threat protection application push basis. That is, the threat protection application can provide or "push" log file data when an IT operating anomaly or cybersecurity threat is detected. The amount of data that can be contained within the plurality of log files can be large. Further embodiments include concentrating the plurality of heterogeneous log files as part of the ingesting. The concentrating can be based on compression, encoding, and so on. In embodiments, the concentrating is provided by a SIEM application.

The flow 100 further includes evaluating the plurality of heterogeneous log files 130 that were ingested. The evaluating can include determining accuracy of the log files, consistency of the log files, relevance of the log files, and so on. In the flow 100, evaluating enables identification of cybersecurity threat protection application capabilities 132. The application capabilities can be based on performance metrics, accuracy, the types of cybersecurity threats that can be detected by an application, and the like. In embodiments, the cybersecurity threat protection application capabilities can include endpoint protection, anti-phishing protection, antivirus protection, firewall protection, man-in-the-middle protection, denial of service protection, distributed denial of service protection, and ransomware protection.

The flow 100 includes sorting 140 each of the plurality of log files. The plurality of log files can be sorted based on a variety of criteria. The sorting the log files can be based on a type of cybersecurity threat, relevance of the contents of a log file, a frequency of threat occurrences, and so on. The sorting can include correlating disparate terminologies or designations used by different threat protection applications for substantially similar threats. In the flow 100, the sorting enables identification of cybersecurity threat protection elements 142 among the plurality of log files. The threat protection elements can include a threat type, a threat severity, a threat frequency, etc. In the flow 100, the threat protection elements include non-cybersecurity, network-related elements 144. The network-related elements can be associated with network infrastructure such as switches, routers, domain name services, and so on. In embodiments, the non-cybersecurity, network-related elements can include information technology (IT) tool output, network configuration data, cybersecurity threat protection application metadata, network-related metadata, network client physical location data, network client internet protocol (IP) identification data, and user-entered data.

The flow 100 includes integrating 150 the cybersecurity threat protection elements that were identified. The integrating can be used to determine additional information, provided by the plurality of cybersecurity threat protection applications, that is relevant to or associated with a cybersecurity threat. In a usage example, a first cybersecurity threat protection application can indicate that one or more incoming email messages may contain phishing cybersecurity threats, a second threat protection application can indicate the source and target of the threat, while a third application can determine the type of phishing threat. In embodiments, the integrating the cybersecurity threat protection elements can be controlled by integration configuration. An integration configuration can be based on connecting and disconnecting one or more integration components, where an integration component can include an orchestrator, an email sender, and email IMAP monitor, a virus counter, productivity tools, cloud-based security, a server search engine, malware protection, SIEM tools, etc. The integration configuration can be performed by a cybersecurity professional, obtained from a configuration library, learned through machine learning, and so on.

The flow 100 includes evaluating 160 the cybersecurity threat protection elements that were integrated. The evaluating can be based on a value, a percentage, a count, a threshold, and so on. The evaluating can be based on a severity level. A severity level can be determined based on a calculation, a lookup table access, and the like. In embodiments, the evaluating can be based on an impact score. The flow 100 includes generating at least one response 170 for cybersecurity threat management, based on a result of the evaluating. A response to a cybersecurity threat can include isolating endpoint devices and IT infrastructure, providing email messages about an ongoing cybersecurity threat, and so on. Responding to the cybersecurity threat can include executing threat countermeasures. The countermeasures can include locking down, blocking, or disabling one or more devices; blocking network access by updating a firewall to block one or more ports and one or more communications protocols; initiating virus, Trojan, or cryptojacking countermeasures; activating security or law enforcement; and the like. Responding to the cybersecurity threat can include activating one or more data enrichment protocols for a threat. A data enrichment protocol can be based on data stimuli received from a cybersecurity threat protection application. Viruses, Trojan horse programs, phishing attacks, and other forms of cybersecurity threats are constantly evolving. As a result, response techniques must also progress and adapt. Threat response data can be updated or enriched by consulting in-house experts, learning from previous response successes and failures, and so on. The enrichment can enable modification or adaptation of the applications. One or more data enrichment protocols can enable modification of a typical response for the threat. In embodiments, the at least one response can be based on a workflow. Discussed in detail below, a workflow can be developed to address a particular type of cybersecurity threat. The workflow can be based on tasks associated with countering cybersecurity threats, commands associated with the tasks, and the like. In the flow 100, the response is provided 172 to a cybersecurity threat management entity. The cybersecurity threat management entity can include a human, an application, a computer, a network, and so on. In embodiments, the cybersecurity threat management entity can be a cybersecurity professional. The cybersecurity professional can include an in-house expert, a contracted consultant, a government agent, and the like. In other embodiments, the cybersecurity threat management entity is a security orchestration automation and response (SOAR) application. The SOAR application can include a commercially available application, an in-house application, etc.

The flow 100 further includes generating a set of rules 174 to enable the sorting, the integrating, the evaluating, and the generating. The rules can be used to develop a code, an algorithm, a heuristic, and so on, that can be used to counter cybersecurity threats. The rules can be generated using a variety of techniques. In embodiments, the set of rules can be determined using human input. The human input can be collected from one or more cybersecurity professionals, IT experts, law enforcement officials, and others involved in cybersecurity threat event response. In other embodiments, the set of rules can be determined using machine learning (ML). The machine learning techniques can be used to identify threat response strategies that have succeeded to improve strategies that require improvement, to discard strategies that do not work, etc. In other embodiments, the set of rules can be determined using a combination of human input and machine learning. The combination of human input and machine learning can be used to quickly refine threat response strategies, to react to new threats, and the like. The flow 100 further includes enabling the sorting, the integrating, the evaluating, and the generating using machine learning 176. The machine learning can be used to fine tune the effectiveness of the sorting, the efficiency of the integrating, and the quality of the evaluating. In embodiments, the machine learning was trained, at least in part, using the accessing. The accessing can be used to obtain cybersecurity threat information that can be used to train the machine learning component. Postmortem evaluation of the effectiveness of the proposed threat responses can further be used to fine tune the machine learning.

Various embodiments of the flow 100 can be included in a computer program product embodied in a non-transitory computer readable medium that includes code executable by one or more processors.

Figure 2:
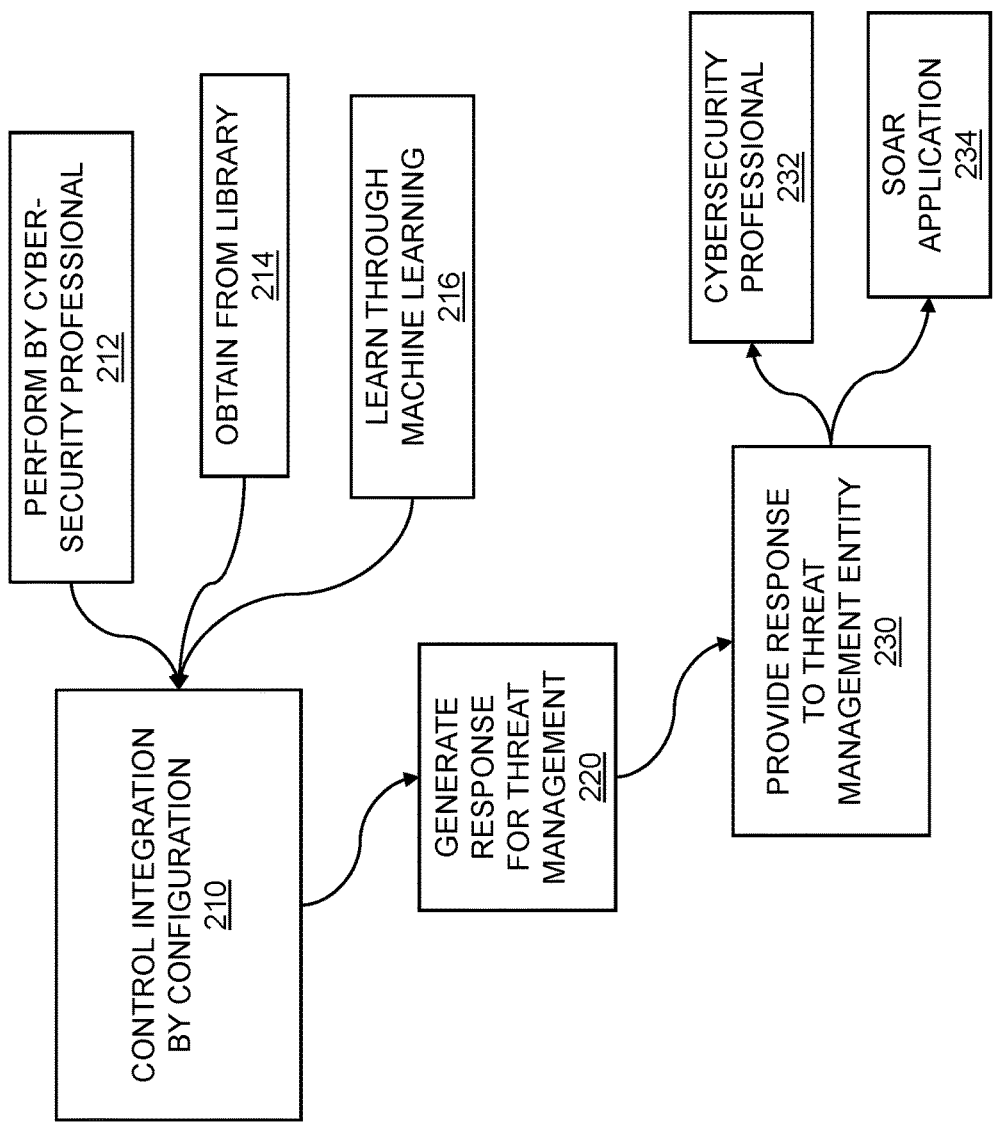
FIG. 2 is a flow diagram for threat response.

FIG. 2 is a flow diagram for threat response. A wide variety of cybersecurity threats exist, where each threat requires an effective response to counteract the threat. Discussed above and throughout, network-connected cybersecurity threat protection applications can be brought to bear to detect anomalous IT infrastructure operation and threats. More than one threat protection application can detect a threat, detect different aspects of a threat, and so on. The log files created by the threat protection applications can be integrated and sorted for key threat elements. The key threat elements can be evaluated and one or more responses to the threat can be generated. Threat response based on network-connected cybersecurity threat protection applications enables integrated cybersecurity threat management. A plurality of network-connected cybersecurity threat protection applications is accessed. A plurality of heterogeneous log files is ingested, wherein the log files are generated by at least two of the plurality of cybersecurity threat protection applications. Each of the plurality of log files is sorted, wherein the sorting enables identification of cybersecurity threat protection elements among the plurality of log files. The cybersecurity threat protection elements that were identified are integrated. The cybersecurity threat protection elements that were integrated are evaluated. At least one response for cybersecurity threat management is generated, based on a result of the evaluating.

The flow 200 includes controlling the integrating of cybersecurity threat protection elements by integration configuration 210. A configuration can include connecting or disconnecting one or more "integrators", where an integrator can provide management facilities; monitoring capabilities; access to productivity, front-office, and back-office tools; access to cloud-based services; and so on. In embodiments, an integrator can include an orchestrator (e.g., a manager), email capabilities, an email IMAP monitor, virus counters, productivity tools, cloud-based security, a server search engine, malware protection, security information and event management (SIEM), and the like. In the flow 200, the integration configuration can be performed by a cybersecurity professional 212. The cybersecurity professional can include a trained, certified, or otherwise credentialed person. The cybersecurity professional can include an enterprise employee, a consultant, etc. In the flow 200, the integration configuration can be obtained from a configuration library 214. The configuration library can be associated with an enterprise, uploaded by a user, provided by a vendor, etc. The configuration library can be crowdsourced. In the flow 200, the integration configuration can be learned through machine learning 216. Machine learning can be accomplished using a network such as a neural network. The neural network can be configured for machine learning. The machine learning (ML) network can be trained by providing the network with data such as a training dataset. The dataset comprises data and expected results, conclusions, inferences, and so on. The machine learning network is trained by adjusting weights and biases associated with the network until the network produces inferences commensurate with the training dataset provided. After training, the machine learning network can be used to process data that the network has not previously encountered.

The flow 200 includes generating at least one response 220 for cybersecurity threat management. The generating can be based on a result of evaluating cybersecurity threat protection elements that were integrated from sorted cybersecurity threat protection application log files. The generating a response can include isolating devices such as endpoint devices, interrupting network access to IT infrastructure, disabling user accounts, and so on. The generating a response can include initiating a workflow. The workflow can include a variety of tasks associated with cybersecurity threat management, such as preparation, identification, containment, eradication, recovery, and so on. Each task can have commands associated with the task. The commands can include sending email to various parties, searching for duplicate threat notifications, querying the reputation of an IP address or URL, determining whether email is legitimate or spam, deleting problem email messages, resetting passwords, etc. In the flow 200, the response that is generated is provided 230 to a cybersecurity threat management entity. The threat management entity can include a human, a computer, a software application, and so on. In the flow 200, the cybersecurity threat management entity can be a cybersecurity professional 232. The cybersecurity professional can include a person associated with an enterprise experiencing a cybersecurity threat, a consultant, a government agent, and the like. In the flow 200, the cybersecurity threat management entity can be a security orchestration automation and response (SOAR) 234 application. A SOAR application can handle a variety of tasks associated with cybersecurity threat management. The application can present and execute workflow that can address the threat, enable communication to individuals affected by the threat, open communication to law enforcement and government agencies, etc.

Various embodiments of the flow 200 can be included in a computer program product embodied in a non-transitory computer readable medium that includes code executable by one or more processors.

Figure 3:
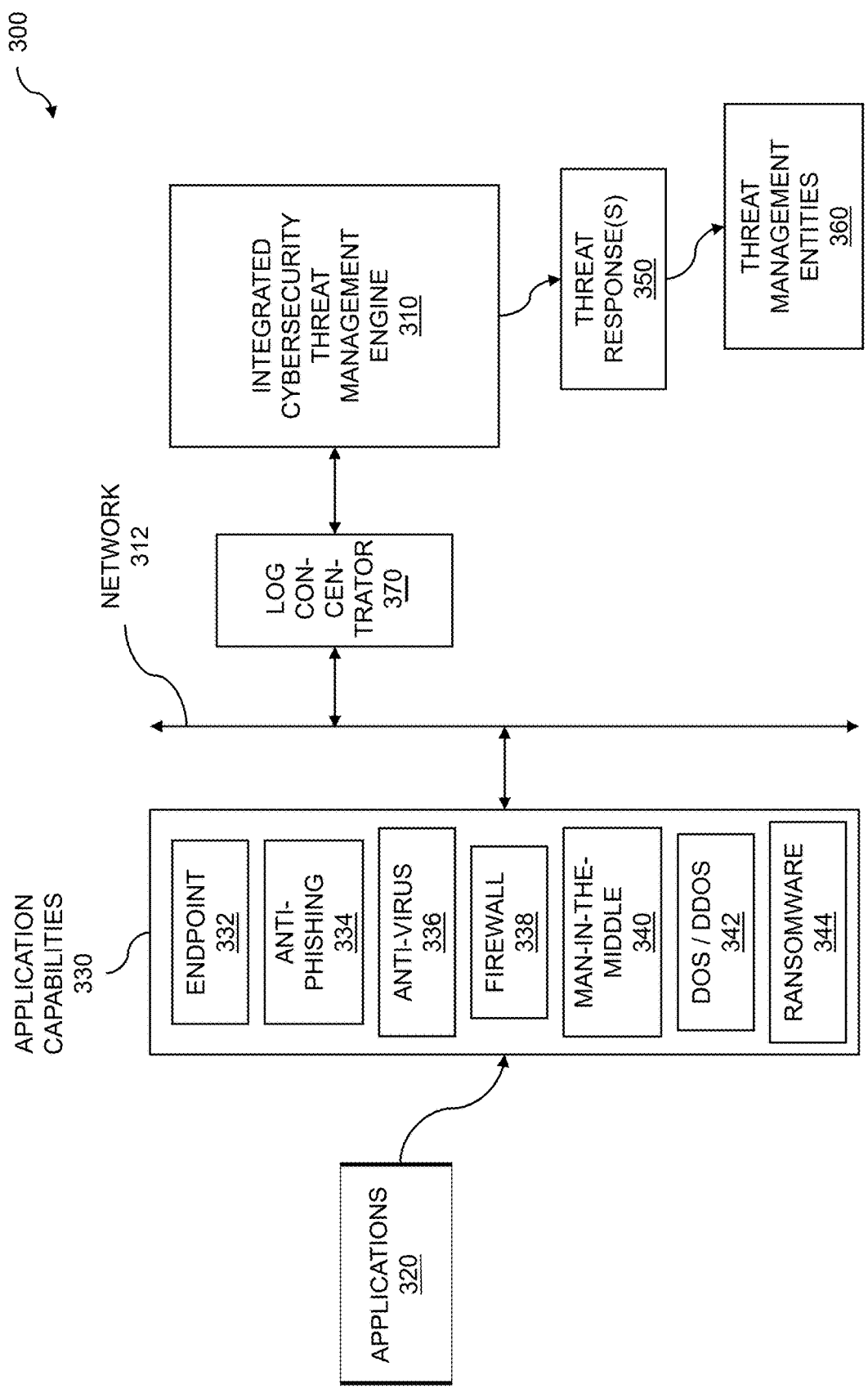
FIG. 3 is a system block diagram for threat management.

FIG. 3 is a system block diagram for threat management. Threat management such as cybersecurity threat management includes detecting one or more cybersecurity threats and generating one or more responses to those threats. The threats can originate from within an organization, from beyond an organization, or from sources within and beyond the organization. The threats can range from relatively minor ones that can be easily detected and eradicated, to major threats that completely disable the organization. The threats can be detected using one or more applications that can monitor a variety of IT-based activities. By integrating capabilities of cybersecurity threat protection applications, threat management can be accomplished. A plurality of network-connected cybersecurity threat protection applications is accessed. A plurality of heterogeneous log files is ingested, wherein the log files are generated by at least two of the plurality of cybersecurity threat protection applications. Each of the plurality of log files is sorted, wherein the sorting enables identification of cybersecurity threat protection elements among the plurality of log files. The cybersecurity threat protection elements that were identified are integrated. The cybersecurity threat protection elements that were integrated are evaluated. At least one response for cybersecurity threat management is generated, based on a result of the evaluating.

An example system block diagram 300 for threat management is shown. Threat management such as cybersecurity threat management is critical to an organization. The cybersecurity threat management is used to monitor operations such as data operations within the organization. When anomalies or outright threats are detected, threat management applies a variety of techniques to determine the cause of an anomaly, a source of a threat, and responses to the anomalies and threats. The system block diagram 300 can include an integrated cybersecurity threat management engine 310. The management engine can access applications; collect and ingest log files from the applications; sort, integrate, and evaluate threat protection elements; and so on. The engine can include one or more processors, processor cores within integrated circuits or chips, central processing units (CPUs), graphics processing units (GPUs), and so on. The management engine can be coupled to a network 312 such as a computer network. The network can be based on wired and wireless communications techniques.

The system block diagram can include a plurality of applications 320. The applications can include network-connected cybersecurity threat protection applications. The applications can perform tasks such as network and processor monitoring; data integrity monitoring; data, services, and physical access control; etc. Some applications within the plurality of threat protection applications can perform unique tasks, can perform similar or redundant tasks, and the like. The applications within the plurality of cybersecurity threat protection applications can include application capabilities 330. The application capabilities can include endpoint protection 332. Endpoint protection can include authentication and supervision of "endpoint" devices. The endpoint devices can include desktop computers, laptop computers, tablet computers, personal electronic devices such as smartphones and PDAs, and so on. Endpoint protection can include enabling access of the endpoint devices based on one or more rights. Access rights can include creating, editing, and deleting files, folders, and so on. Access rights can include read-write, read-only, write-only (e.g., a drop box), etc. Endpoint protection can restrict access, impose security rules, and the like.

Application capabilities can include anti-phishing 334 techniques. "Phishing" threats can be based on sending fraudulent email messages, where the messages appear to be sent from a legitimate sender who may be known to the recipient. The messages are used to gather sensitive, identifying information about an individual which is then used to defraud the individual. The application capabilities can include anti-virus 336 techniques. Anti-virus techniques can be used to detect viruses that can be embedded in data such as images, audio files, and so on. The application capabilities can include firewall 338 techniques. Firewall techniques can be used to block network traffic, applications, etc. that can attempt to penetrate a network and IT infrastructure using one or more network ports and communications protocols. The application capabilities can include man-in-the-middle detection and prevention techniques 340. A "man-in-the-middle" cybersecurity threat includes interception of communications between a user or endpoint device and an entity with which the user or endpoint device is trying to communicate. The communications interception attempts to extract personal or identifying information from the communications for fraudulent purposes. The application capabilities can include denial of service (DOS) and distributed denial of service (DDoS) 342 detection techniques. Denial of service attacks attempt to render a website, computer, processor, and so on unreachable or unusable by overwhelming it with requests. The application capabilities can include ransomware 344 detection techniques. Ransomware attacks encrypt a victim's data. The encrypted data is only decrypted, if at all, after payment of a ransom.

The system block diagram 300 includes one or more threat responses 350. The one or more threat responses are generated by the integrated cybersecurity threat management engine 310. The generated responses can be provided to a cybersecurity threat management entity 360. A cybersecurity threat management entity can include a human-based entity, a machine-based entity, and a combination of human-based and machine-based entities. In embodiments, the cybersecurity threat management entity can be a cybersecurity professional. The cybersecurity professional can be an employee of an organization, a consultant to the organization, and so on. In other embodiments, the cybersecurity threat management entity can be a security orchestration automation and response (SOAR) application. The SOAR application can handle threat detection, response generation, case tracking, and so on. The system block diagram can include a log concentrator 370. The log concentrator can sort a plurality of log files, can integrate the log files, and so on. The concentrator can extract key information from the log files. The concentrator can compress log file data.

FIG. 4 illustrates a sample log file. A cybersecurity threat protection application can generate a log file. The log file can track operation of the application, detect threats, identify anomalies, and so on. A log file can present log information in various data formats such as text, numbers, codes, and so on. The log file contents can be processed, where the processing can include sorting, integrating, evaluating, and so on. The results of the log file processing can be used to generate one or more responses to a cybersecurity threat. More than one log file can be used, where the log files can include heterogeneous contents within the log files. Application log files support integrated cybersecurity threat management. A plurality of network-connected cybersecurity threat protection applications is accessed. A plurality of heterogeneous log files is ingested, wherein the log files are generated by at least two of the plurality of cybersecurity threat protection applications. Each of the plurality of log files is sorted, wherein the sorting enables identification of cybersecurity threat protection elements among the plurality of log files. The cybersecurity threat protection elements that were identified are integrated. The cybersecurity threat protection elements that were integrated are evaluated. At least one response for cybersecurity threat management is generated, based on a result of the evaluating.

A sample log file is shown 400. The sample log file can represent the log output generated by a network-connected cybersecurity threat protection application. The log file can include data associated with operating system events, user activities, and so on. The events, activities, etc. can be associated with normal, standard, and allowed operations such as data operations. The log file can further include data associated with cybersecurity threats, abnormal system operations, operation anomalies, etc. The log file can include one or more event names 410. The events that are named can include operating system events, user events, etc. In embodiments, the events can include API request successful, search completed, search executed, information message, and so on. The log file can include a log source 412. The log source can include an audit, a monitor, a "watch dog" application, and the like. The log file can include an event count 414. The log count can be used to indicate a presence of a unique event occurrence, repeated event occurrences, etc. The log count can be used to trigger an alarm, an action, a notification, and so on.

The log file can include a time 416. The time can be associated with one or more events. The time can indicate standard time (e.g., GMT, UTC) or local time. The time can indicate elapsed time such as an amount of time since an event occurrence. The log file can include a low-level category 418 action. The low-level action can include an action performed by an IT system, an operating system, and so on. The low-level action can be associated with an operation, activity, and so on initiated by a user. In embodiments, a low-level action can include a user action, an information action, and the like. The log file can include a source Internet Protocol (IP) address 420. The IP address can be represented in decimal, hexadecimal, and other address representation formats. The IP address can include an address within a domain associated with an organization, or an address not associated with the enterprise. The log file can include a source port 422. A port can be associated with communications protocols such as TCP, UDP, and so on. The source port can include a standard port such as a port commonly used for file transfers, remote shells, webpages, etc. The log file can include a destination IP address 424. The destination IP address can include an address with the enterprise domain or an address beyond the enterprise domain. The log file can include a destination port 426. The destination port can include a standard port, a nonstandard port, a port known to be used for cyber-attack vectors, etc. The log file can include a username 428. In some instances, the username can include a name of a legitimate user associated with an enterprise. In other instances, the username can include a fictitious name, a spoofed name of a legitimate user, and the like. The username can also be unavailable. The log file can include a magnitude 430. A magnitude can include a known severity, a predicted or anticipated severity, and so on. The magnitude can be indicated by a color such as green, yellow, red, and so on. The magnitude can be presented by a number, a color and a number, etc.

FIG. 5 shows sample integration configuration. Discussed above and throughout, contents of heterogeneous log files can be sorted, and the sorted contents can be integrated. The integrating can be based on determining that one or more network-connected cybersecurity threat protection applications have detected a threat, and that various cybersecurity threat management tools can be applied to confirming, tracking, remedying, etc., the detected threat. Configuration enables integrated cybersecurity threat management. A plurality of network-connected cybersecurity threat protection applications is accessed. A plurality of heterogeneous log files is ingested, wherein the log files are generated by at least two of the plurality of cybersecurity threat protection applications. Each of the plurality of log files is sorted, wherein the sorting enables identification of cybersecurity threat protection elements among the plurality of log files. The cybersecurity threat protection elements that were identified are integrated. The cybersecurity threat protection elements that were integrated are evaluated. At least one response for cybersecurity threat management is generated, based on a result of the evaluating.

Various cybersecurity threat protection applications can be integrated into a configuration. Integrations can in turn be configured to address more complex cybersecurity threat scenarios. A sample integration configuration is shown 500. The integration configuration can include one or more integrations, where each integration can be identified by an integration name 510. An integration can perform a function, accomplish a task, and so on. In embodiments, the integrations can include an orchestrator, an email sender, a first email IMAP monitor, a virus total (i.e., a virus count), productivity tools, cloud-based information security, a server search engine, a front office suite, malware protection, resilience, a second email IMAP monitor, security information and event management (SIEM), and so on. The integration configuration can include a status 512. The status can indicate whether an integration is connected or disconnected. The integration configuration can further include one or more actions 514. The one or more actions can include editing an integration, deleting a configuration, adding an integration, etc.

The integrating of various cybersecurity threat protection elements is controlled by the integration configuration. The integration can be performed using human-based techniques, machine-based techniques, and so on. The integration configuration can be created, uploaded, downloaded, purchased, and the like. In embodiments, the integration configuration can be performed by a cybersecurity professional. The cybersecurity professional can manually generate the integration configuration, use a workflow tool to create and edit a configuration, etc. In other embodiments, the integration configuration can be obtained from a configuration library. The configuration library can be created by an enterprise for use by the enterprise, purchased or downloaded from an online library, and so on. In further embodiments, the integration configuration can be learned through machine learning. A network such as a neural network configured for learning can be trained based on data. The data can be associated with expected results, inferences, and so on. The neural network can learn from previous cybersecurity threat incidents, effective reaction strategies, ineffective reaction strategies, etc., to predict how to react to new cybersecurity threats.

Figure 6:
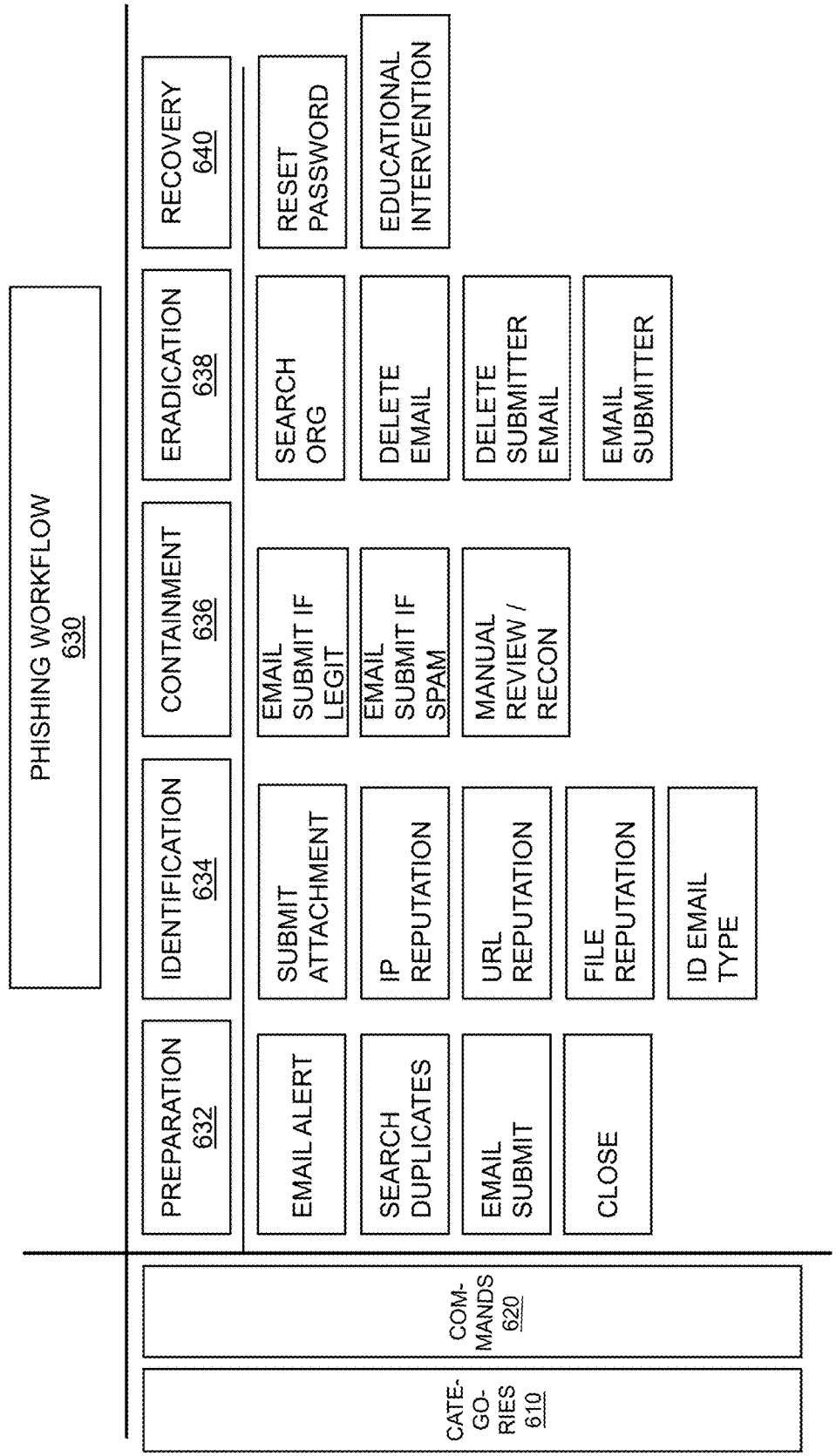
FIG. 6 illustrates a sample phishing workflow.

FIG. 6 illustrates a sample phishing workflow. A plurality of workflows can be developed, where the workflows can be used to enable cybersecurity threat management. The plurality of workflows can include a phishing workflow, where the phishing workflow can be initiated upon detection of a phishing cybersecurity threat. A given workflow can comprise one or more tasks, where one or more commands can be associated with a task. A workflow can be created, edited, displayed, etc. using a graphical user interface (GUI), a rendering tool, and so on. The GUI can enable creation and editing of a workflow by supporting the dragging and dropping of tasks, commands, and so on, into a workflow. The workflows can include cybersecurity categories, management tasks associated with a cybersecurity category, etc. A phishing workflow enables integrated cybersecurity threat management. A plurality of network-connected cybersecurity threat protection applications is accessed. A plurality of heterogeneous log files is ingested, wherein the log files are generated by at least two of the plurality of cybersecurity threat protection applications. Each of the plurality of log files is sorted, wherein the sorting enables identification of cybersecurity threat protection elements among the plurality of log files. The cybersecurity threat protection elements that were identified are integrated. The cybersecurity threat protection elements that were integrated are evaluated. At least one response for cybersecurity threat management is generated, based on a result of the evaluating.

A sample workflow for handling a phishing cybersecurity threat is illustrated 600. The workflow can be created, viewed, edited, initiated, operated, manipulated, and so on, using a graphical user interface (GUI). The phishing workflow can be rendered on a screen or display associated with a computing device such as a desktop or laptop computer, a tablet, a server, and so on. The GUI can enable selection of the phishing workflow based on mouse or trackpad clicking, menu selection, and so on. The phishing workflow can be based on one or more cybersecurity categories 610. One or more categories can be selected for workflow creation, editing, etc. In embodiments, the categories can include security information and event management (SIEM), user and entity behavior analytics, information technology (IT) service management, password vaulting, threat intelligence platform (TIP), data integration, cyber deception, IT administrative services and development and operations (DevOps), network performance monitoring and diagnostics, vulnerability management, and the like. The phishing workflow can further include commands 620. The commands can perform file operations, and can check conditions, etc. that can be associated with a phishing cybersecurity threat. There can be more commands than categories, fewer commands than categories, and so on. In embodiments, the commands can include endpoint malware alert, pass file hash to identification phase, analyst review, get file, quarantine host, confirm user function request, generate report, endpoint shutdown, security operations center (SOC) alert, close incident, fetch virus total score, and so on.

The phishing workflow includes a workflow title 630. The title, in this example, "Phishing Workflow", can include characters, numbers, special characters, and the like. The workflow title can include a version or revision number, a creator or provider name, and so on. In addition to the workflow name, one or more radio buttons can be rendered. The radio buttons can include workflow details under which a user can initiate various tasks associated with the workflow, execute the workflow, etc. Other radio buttons can enable adding, editing, and deleting tasks, commands, and the like, while further radio buttons can include trash or delete a workflow, preview to simulate a workflow, etc. In the example shown, the radio buttons can include preparation 632, identification, 634, containment 636, eradication 638, recovery 640, etc. One or more actions, tasks, commands, and so on, can be associated with each radio button. In the example shown, selecting preparation 632 can provide access to an email alert, searching for duplicate notifications or warnings, submitting email, closing a cybersecurity threat case, and so on. Selecting identification 634 can provide access to submitting an attachment; querying the reputation of an IP address, a URL, or a file; identifying an email type, and the like. Selecting the containment button 636 can provide access to submitting email if legitimate or if spam; initiating manual review or reconnaissance, etc. Selecting the eradication button 638 can provide access to searching an organization, deleting email, deleting submitter email, emailing a submitter, and so on. Selecting the recovery button 640 can provide access to recovery and remediation tasks such as resetting a password, providing educational intervention, etc. Other radio buttons that provide access to other tasks associated with a workflow such as a phishing workflow may also be included.

Figure 7:
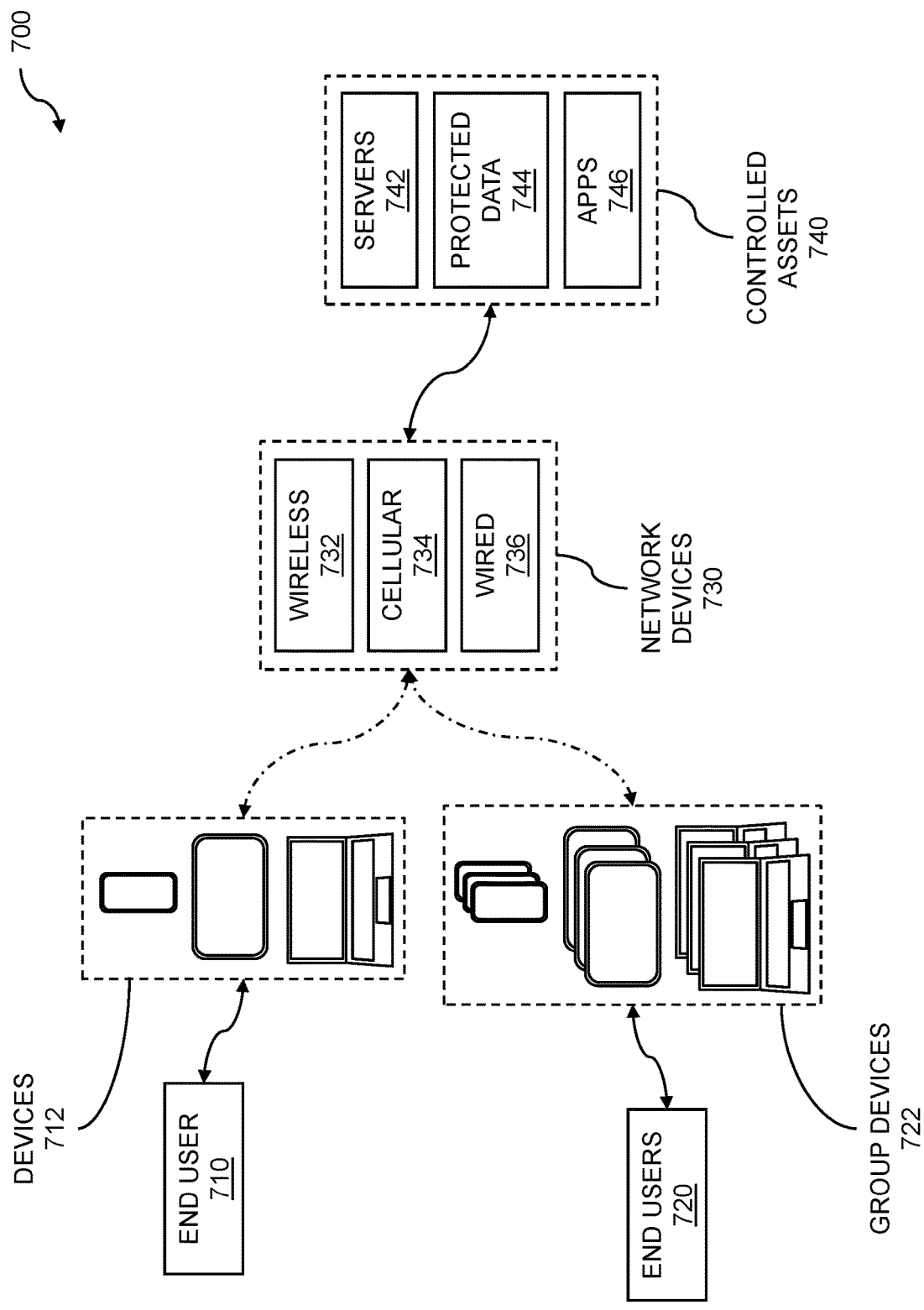
FIG. 7 is a system block diagram for devices and groups.

FIG. 7 is a system block diagram for devices and groups. Cybersecurity threats pose extreme risks to data networks associated with individual users, business enterprises, universities, hospitals, government agencies, and so on. Management of a cybersecurity threat can include identifying that a threat exists, determining the type of threat, blocking or removing the threat, and so on. Threat management techniques can be applied to individual devices, groups of devices, networks, IT assets, and so on. Cybersecurity management of devices and groups uses integrated threat management. A plurality of network-connected cybersecurity threat protection applications is accessed. A plurality of heterogeneous log files is ingested, wherein the log files are generated by at least two of the plurality of cybersecurity threat protection applications. Each of the plurality of log files is sorted, wherein the sorting enables identification of cybersecurity threat protection elements among the plurality of log files. The cybersecurity threat protection elements that were identified are integrated. The cybersecurity threat protection elements that were integrated are evaluated. At least one response for cybersecurity threat management is generated, based on a result of the evaluating.

A system block diagram 700 for an individual user, groups of users, and devices is shown. A user 710 can access one or more devices 712. The user can include an employee, a contractor, a faculty member, a student, a physician, a nurse, a manager, a salesperson, and so on. The user can have access the one or more devices for purposes such as interacting with an enterprise, university, hospital, retail establishment, and the like. The devices can include personal electronic devices, electronic devices issued by an employer, etc. The devices can include a handheld device such as a smartphone, tablet, PDA, and the like. The devices can include a laptop, a lightweight device such as a Chromebook™ or similar device, and so on. A group of users 720 can access a plurality of devices 722. The group of users can also include employees, university or hospital affiliates, etc. The users can access a plurality of devices for purposes such as interacting with an enterprise, etc. The devices can include personal electronic devices, electronic devices issued by an employer, etc. The devices can include handheld devices, a laptop, a lightweight device, etc.

In the system block diagram 700, communication to and from individual devices, groups of devices, and so on, is accomplished using one or more network devices 730. The network devices can support data transfer, network resource access, and the like. Various types of network devices can be used. In embodiments, the network devices can support wireless 732 networking. The wireless network can be based on standard computer communication protocols such as 802.11 Wi-Fi, Bluetooth, etc. In other embodiments, the network devices can support cellular 734 communication. The cellular communication can be based on standard protocols such as Code-Division Multiple Access (CDMA) and Global System for Mobile Communications (GSM) standards. The cellular communication can include 4G, 5G, and so on. In other embodiments, the network devices can support wired 736 communication. The wired network communication can be based on standards such as Ethernet™.

The individual users and groups of users can use their devices to communicate with controlled assets 740. Access to controlled assets can require authentication such as a username and password, two-factor authentication, a cryptographic key, and so on. In the system block diagram 700, the controlled assets can include servers 742. The servers can include processors, CPUs, GPUs, processor cores, and so on. The servers can include parallel processors. The servers can include customized servers for specialized applications. The controlled assets can include protected data 744. The protected data can include secured data, confidential data, classified data, and the like. Access to the protected data can be based on authentication, on a job type, on an employee rank, etc. The controlled assets can include applications 746. The applications can include specialized applications for data analysis; proprietary code for design, analysis, and processing; etc. Access to the applications can also include authentication, access controlled by an access control list (ACL), and the like.

Figure 8:
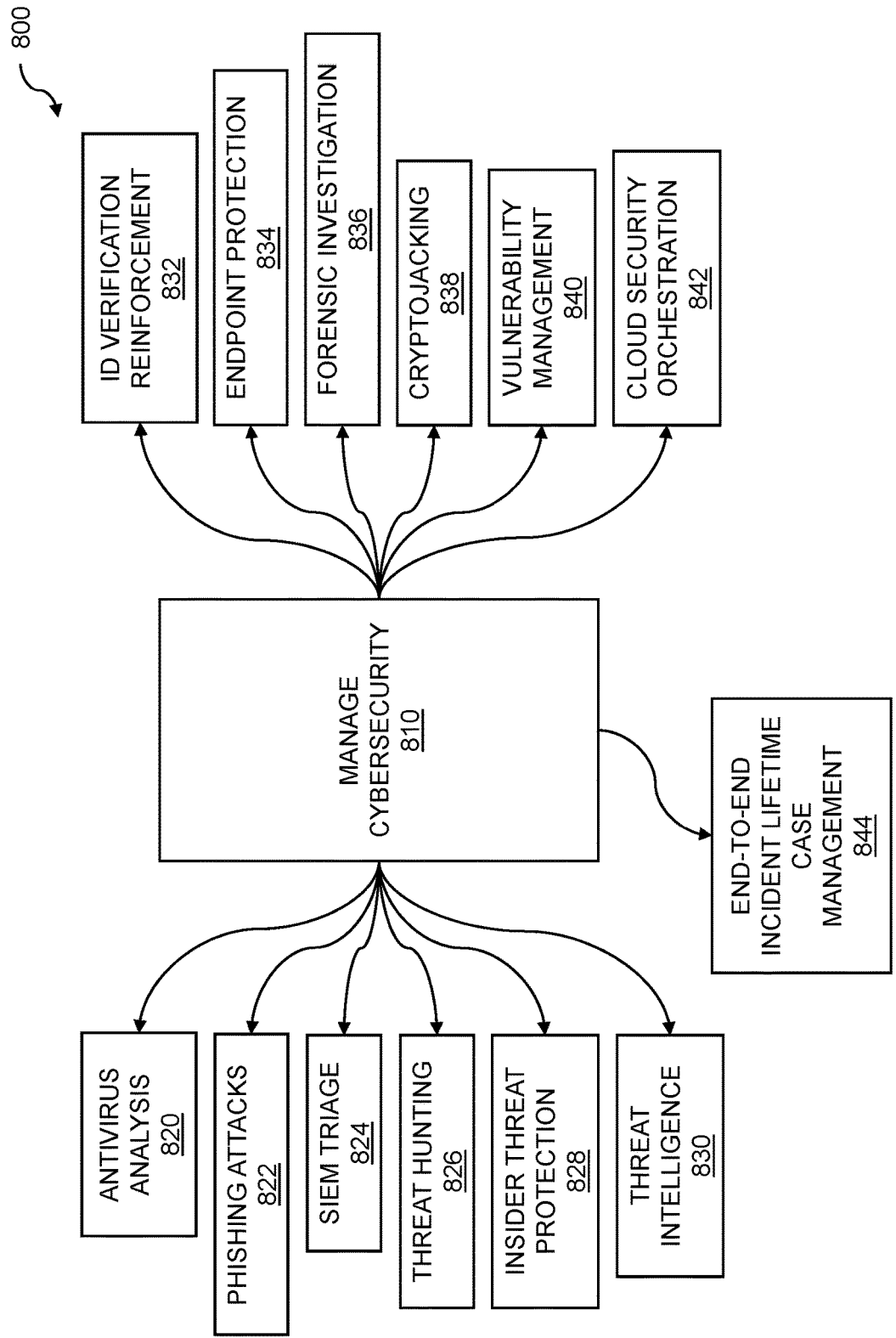
FIG. 8 illustrates cybersecurity management.

FIG. 8 illustrates cybersecurity management. Information technology (IT) infrastructure comprises computing devices, storage devices, networks, perhaps personal devices, and so on. Whether these IT elements are operated by an individual for personal use or by an organization in support of operations, all of the IT elements are targets of attacks from outside an organization. Worse yet, the attacks can even originate from within an organization. Cybersecurity threat management includes accessing a variety of threat protection applications. The applications can detect an attack, determine the type of attack, determine the origin of an attack, and so on. Further, cybersecurity management provides techniques for addressing issues resulting from the attacks by countering the attacks and rectifying issues caused by the attacks. The various threat protection applications provide elements for detecting, neutralizing, countering, and rectifying cybersecurity threats. The elements associated with the applications can address substantially similar cybersecurity needs. Cybersecurity management is accomplished using integrated cybersecurity. A plurality of network-connected cybersecurity threat protection applications is accessed. A plurality of heterogeneous log files is ingested, wherein the log files are generated by at least two of the plurality of cybersecurity threat protection applications. Each of the plurality of log files is sorted, wherein the sorting enables identification of cybersecurity threat protection elements among the plurality of log files. The cybersecurity threat protection elements that were identified are integrated. The cybersecurity threat protection elements that were integrated are evaluated. At least one response for cybersecurity threat management is generated, based on a result of the evaluating.

The diagram 800 includes cybersecurity management 810. Cybersecurity management can include prioritizing a variety of IT techniques for identifying threat risks, correcting identified risks, counteracting active threats, and so on. Cybersecurity management can be based on accessing a range of applications (discussed below) which can include antivirus software, access control, data encryption, network channel encryption, and the like. In embodiments, cybersecurity includes managing the plurality of threat protection applications for a data network. The techniques that can be used for cybersecurity management can be based on one or more workflows. The workflows, which can include cybersecurity tasks and commands, can automate various tasks associated with cybersecurity management. In embodiments, the managing cybersecurity can include graphical control of the plurality of cybersecurity threat protection applications. The graphical control can enable dragging and dropping of tasks, commands, and so on into a workflow. In other embodiments, the automation workflows can support dynamic swapping of cybersecurity threat protection applications. The workflows can support swapping-in or swapping-out one or more threat protection applications. The swapping-in and the swapping-out are enabled by a universal data layer (UDL). The UDL enables applications to be swapped without having to edit a workflow or create a new workflow to address the swapped-in application.

The diagram 800 includes antivirus analysis 820. Antivirus analysis can include virus detection, Trojan horse program detection, and so on. The analysis can include determining a source or vector of a virus, the actions taken by the virus, how to counter actions taken by the virus, to whom the virus might be in communication, etc. The antivirus analysis can be used to determine changes or updates to the virus, and how to better detect the virus before it can be deployed. The diagram 800 can include analysis of phishing attacks 822. Phishing is a form of attack that attempts to fraudulently obtain personal, sensitive, or private data and information. The data or information that is sought by a phishing attack can include personal information such as name, address, date of birth, telephone numbers, email addresses, and so on. The information can further include government-related information such as social security numbers, tax records, military service information, etc. The information can also include usernames and passwords to sensitive websites such as banks, brokerages, hospitals and health care providers, and the like. A phishing attack can purport to be from an entity known to a user by presenting the user with a legitimate looking webpage. However, links on the fraudulent page do not take the user to the legitimate site, but rather to a site designed to steal the victim's data.

The diagram 800 includes security information and event management (SIEM) triage 824. SIEM, which combines the management of security information and security events, can provide analysis of security alerts, alarms, warnings, etc., in real time. The alerts that are analyzed can be generated by one or more of the plurality of cybersecurity threat protection applications, by network security hardware, and so on. The triage can be used to determine the severity of an alert, the scale or extent of the alert, the urgency of the alert, and the like. The diagram 800 includes threat hunting 826. Threat hunting can include techniques used to locate cybersecurity threats within a network, where the threats can elude detection using more common threat detection techniques. Threat hunting can include iteratively searching network-connected devices throughout a data network. Threat hunting can be used in addition to common cybersecurity techniques including firewalls for port blocking, intrusion detection, etc. The diagram 800 includes insider threat protection 828. Insider threats are among the most difficult threats to counter because they are perpetrated by people who have knowledge of the security techniques implemented by an organization. An insider threat attack can include physical damage to computing, data, and network systems; data breaches; and the like. Insider threats can result from overly permissive access to sensitive areas or data, lax firewall policies, etc. An insider attack can include moving sensitive data to another device within the organization—a lateral transfer.

The diagram 800 includes threat intelligence 830. Threat intelligence can include information associated with cybersecurity threats, used by an organization. The threat intelligence information can be associated with past security threats, current security threats, and threats likely to arise in the future. The information can be used by the organization to identify cybersecurity threats, to prevent the threats, and to prepare for inevitable threats that are likely to emerge in the future. The diagram 800 includes identity verification reinforcement 832. Identity verification can include techniques to verify that a person who has access to computing systems, data systems, networks, and so on, that are associated with an enterprise, is in fact a real person. Identity verification can be based on physical documents such as a government issued identification documents. The diagram 800 can include endpoint protection 834. In a typical enterprise computing environment, individuals may try to use personal electronic devices to access the enterprise network. Such devices can include laptop computers, tablets, PDAs, smartphones, and the like. Such devices can pose a serious threat to an enterprise network because of operating systems which may not be updated, questionable applications which may be installed on the devices, etc. Endpoint protection can require that any device, including personal electronic devices, meet certain standards prior to connection to the enterprise network. The standards can include approved devices, operating systems, applications, antivirus applications, virtual private network apps, etc.

The diagram 800 includes forensic investigation 836. Digital forensic investigation can include data recovery, data maintenance, and investigation of data and information that can be found on various digital devices. Digital forensic techniques can be applied for investigation of a variety of digital malfeasances including cybercrime. Forensic investigation techniques can be used to determine, track, and locate perpetrators of cybercrime. The diagram 800 includes the detection of cryptojacking 838. Cryptojacking can include hijacking of computers, servers, personal electronic devices, and so on for the purposes of mining cryptocurrency. The diagram 800 includes vulnerability management 840. Vulnerability management seeks to reduce risks to computing systems, data systems, networks, and so on by identifying, evaluating, correcting, and communicating vulnerabilities associated with the computing systems and the applications that are executed on the computing systems. The diagram 800 includes cloud security orchestration 842. Many individuals, and organizations such as businesses, hospitals, universities, and government agencies, use cloud services for processing, data storage, and other IT services. Cloud orchestration can manage relationships, interactions, and communications among computational workloads. The computational workloads can be associated with public cloud infrastructure and private cloud infrastructure. Cloud security orchestration can include imposing permissions and access oversight, and policy enforcement. The diagram 800 includes end-to-end incident lifetime case management 844. An incident can include a virus outbreak, a distributed denial of service (DDoS) attack, and the like. Incident lifetime management can include identifying that an incident has occurred, notifying that the incident has occurred and escalating response to the incident, investigating and diagnosing the incident, resolving the incident, and recovering from the incident. Incident lifetime management can further include closing the incident.

Figure 9:
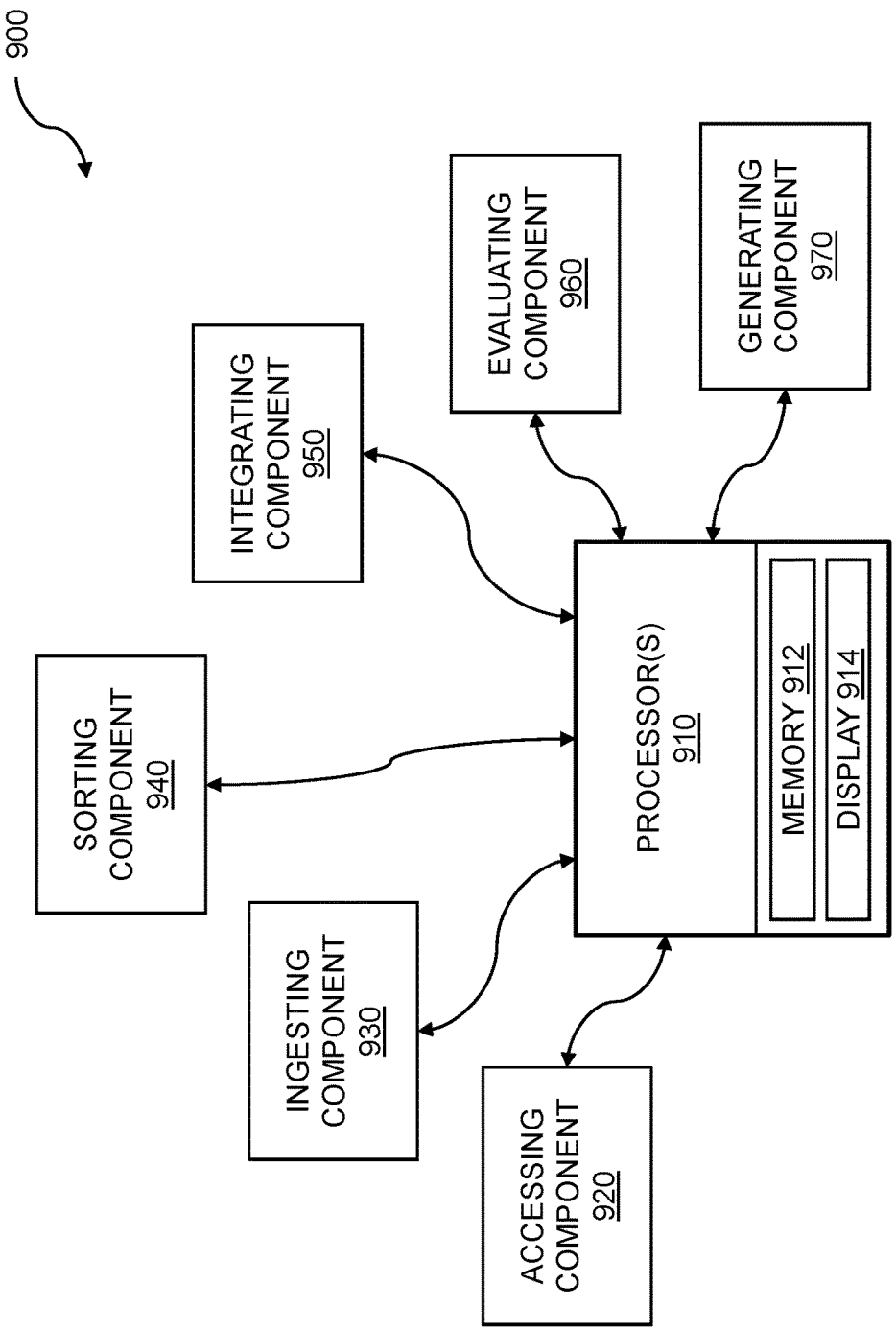
FIG. 9 is a system diagram for integrated cybersecurity threat management.

FIG. 9 is a system diagram for integrated cybersecurity threat management. Organizations of all sizes seek to secure their computing operations and infrastructure against cybersecurity threats. To each of these organizations, the detection of and response to any and all cybersecurity threats are mission critical. The organizational computing operations are based on data operations including transfers, manipulations, storage, security, and so on. The computing infrastructure includes servers, desktop computers, portable devices, etc. Cybersecurity threats have been designed based on social engineering techniques such as phishing attacks, ransomware, distributed denial of service (DDoS) attacks, third-party software hacks, cloud computing and storage vulnerabilities, and the like. Integrated cybersecurity techniques can be used to detect a cybersecurity threat; to determine the extent and severity of the cybersecurity threat; and to remove, neutralize, or counter the threat in as little time and with as minimal disruption as possible. One or more responses to a cybersecurity threat are based on cybersecurity threat protection application log file collection, sorting, integrating, and evaluation. A response can be provided to a cybersecurity threat management entity such as a cybersecurity professional, a security orchestration automation and response (SOAR) application, and so on. A plurality of network-connected cybersecurity threat protection applications is accessed. A plurality of heterogeneous log files is ingested, wherein the log files are generated by at least two of the plurality of cybersecurity threat protection applications. Each of the plurality of log files is sorted, wherein the sorting enables identification of cybersecurity threat protection elements among the plurality of log files. The cybersecurity threat protection elements that were identified are integrated. The cybersecurity threat protection elements that were integrated are evaluated. At least one response for cybersecurity threat management is generated, based on a result of the evaluating.

The system 900 can include one or more processors 910 and a memory 912 which stores instructions. The memory 912 is coupled to the one or more processors 910, wherein the one or more processors 910 can execute instructions stored in the memory 912. The memory 912 can be used for storing instructions, one or more cybersecurity applications, log files, information associated with one or more data networks, and the like. Information associated with cybersecurity threat management can be shown on a display 914 connected to the one or more processors 910. The display can comprise a television monitor, a projector, a computer monitor (including a laptop screen, a tablet screen, a netbook screen, and the like), a smartphone display, a mobile device, or another electronic display.

The system 900 can include an accessing component 920. The accessing component 920 can be used for accessing a plurality of network-connected cybersecurity threat protection applications. The applications can include applications for threat detection, assessment, and response management; web security; antivirus; dark web monitoring; security ("white hat") testing; and other cybersecurity threat protection application capabilities. In embodiments, the cybersecurity threat protection application capabilities can include endpoint protection, anti-phishing protection, antivirus protection, firewall protection, man-in-the-middle protection, denial of service protection, distributed denial of service protection, and ransomware protection. The plurality of cybersecurity threat protection applications can include at least two different data management schemas. A data management schema can include an organization or collection of management techniques associated with data. The management techniques can include data storage, access control to data (e.g., access control list or ACL, role-based access), and so on. The system 900 includes an ingesting component 930. The ingesting component 930 is configured to ingest a plurality of heterogeneous log files, wherein the log files are generated by at least two of the plurality of cybersecurity threat protection applications. The log files from the cybersecurity threat protection applications can include an indication of a potential, detected, or ongoing cybersecurity event or situation. The one or more indications within the one or more log files can include various (i.e., heterogeneous) formats, representations, and so on. The indications can include an alert, a warning, etc. The indications that are ingested from the plurality of heterogeneous log files can be based on substantially similar cybersecurity threat indications.

The system 900 can include a sorting component 940. The sorting component 940 can sort each of the plurality of log files, wherein the sorting enables identification of cybersecurity threat protection elements among the plurality of log files. The cybersecurity threat protection elements that can be identified can include device-related information. The device-related information can include a type of device such as a handheld device, a portable device, a personal device, a device provided by an organization, etc. Discussed previously, the log files that are sorted can include an event name, a log source, an event count, a category such as a low-level category, a source IP address and port, a destination IP address and port, a username, a magnitude, etc. In embodiments, the threat protection elements can include non-cybersecurity, network-related elements. These elements can provide additional information that can help pinpoint a source of a cybersecurity threat, a threat target, a priority level, etc. In embodiments, the non-cybersecurity, network-related elements can include information technology (IT) tool output, network configuration data, cybersecurity threat protection application metadata, network-related metadata, network client physical location data, network client internet protocol (IP) identification data, and user-entered data. The log file information that is sorted can further include information about the user of a device, a data service, and so on. The user information can include identifying information associated with the user; a user's role, status, and rank within an organization; user privileges such as access and security privileges; user location; and the like.

The system 900 can include an integrating component 950. The integrating component 950 can integrate the cybersecurity threat protection elements that were identified. The integrating can include associating, linking, correlating, etc., cybersecurity threat protection elements that were identified by the sorting. In embodiments, the integrating the cybersecurity threat protection elements can be controlled by integration configuration. An integration configuration can be based on rules, algorithms, heuristics, and so on. In embodiments, the integrating the cybersecurity threat protection elements can be controlled by integration configuration. An integration configuration can be uploaded by a user, chosen from a library of integration configurations, downloaded, and so on. The integration configuration can be accomplished using a variety of techniques, where the techniques can be human based, machine based, and the like. In embodiments, the integration configuration can be performed by a cybersecurity professional. The cybersecurity professional can examine the threat protection elements that were identified and can integrate the elements based on a priori skills and knowledge, trained techniques, etc. In other embodiments, the integration configuration can be obtained from a configuration library. The configuration library can include a library created by an enterprise, a collectively created library, a library provided by a third party, etc. In further embodiments, the integration configuration can be learned through machine learning. The machine learning can be accomplished by providing a training dataset of cybersecurity threat protection elements and "known" responses to the threat protection elements to a machine learning network. The machine learning network can include a neural network. The neural network is trained by adjusting weights and biases associated with the nodes or "neurons" of the neural network until the inferences or answers generated by the neural network sufficiently match the known responses.

The system 900 can include an evaluating component 960. The evaluating component 960 can evaluate the cybersecurity threat protection elements that were integrated. The evaluating threat protection elements can include assigning an impact score; a risk factor; a label such as low, medium, high, or extreme; a weight; a percentage; and so on. The evaluating can be based on exceeding a threshold. Further embodiments can include evaluating the plurality of heterogeneous log files that were ingested to enable identification of cybersecurity threat protection application capabilities. Discussed previously, the cybersecurity threat protection application capabilities can include endpoint protection, antivirus protection, firewall protection, distributed denial of service protection, ransomware protection, etc.

The system 900 can include a generating component 970. The generating component 970 can generate at least one response for cybersecurity threat management, based on a result of the evaluating. A response can include starting a workflow to address the threat, initiating a device or access lockdown, commencing a threat eradication procedure, and so on. In embodiments, the response can be provided to a cybersecurity threat management entity. The cybersecurity threat management entity can include a human-based entity, a machine-based entity, and so on. In embodiments, the cybersecurity threat management entity can include a cybersecurity professional. More than one professional can be included. The one or more professionals can activate a workflow, initiate a cybersecurity process or policy, and the like. In other embodiments, the cybersecurity threat management entity can be a security orchestration automation and response (SOAR) application. The application can include an in-house application, a commercially available application, etc.

The generating a response for cybersecurity threat management can include generating a notification. The notification can be used to trigger a variety of responses. The responding to a cybersecurity threat notification can include managing individual devices coupled to a data network, groups of devices, regions of a data network, and so on. The responding can include granting user access to an asset, denying access, isolating one or more devices, notifying security or law enforcement, and the like. The responding can include one or more tasks, procedures, protocols, workflows, techniques, etc., associated with cybersecurity. In embodiments, the responding to a cybersecurity threat can include managing one or more of antivirus analysis, phishing attack response, review, security information and event management (SIEM) triage, threat hunting, insider threat protection, threat intelligence, identity verification reinforcement, endpoint protection, forensic investigation, cryptojacking, vulnerability, cloud security orchestration, and end-to-end incident lifecycle cases. The responding can include "white hat" testing such as penetration testing of one or more of networks, systems, devices, and so on. The white hat penetration testing can include white box testing, where a tester can have full access and knowledge of networks, systems, and so on. The white hat testing can further include black box testing (no access or knowledge), gray box testing (some access and knowledge), etc.

The responding can include simulating or emulating cyber security threats. Embodiments further include simulating cybersecurity threat scenarios by activating inputs of the first mapping independently of the plurality of cybersecurity threat protection applications. The simulation can be based on virtual activation, actual activation, and so on. In embodiments, the simulating virtually activates cybersecurity measures in a simulation mode. One or more devices coupled to a data network can be taken offline, placed in a "security playpen", etc. In other embodiments, the simulating actually activates cybersecurity measures in the data network. The actually activating cybersecurity measures in the data network can be accomplished using a variety of techniques such as activating outputs of the second mapping. Further embodiments include activating one or more data enrichment protocols for a threat, based on the data stimuli received from at least one of the plurality of cybersecurity threat protection applications. The data enrichment can be accomplished by enabling additional features of a cybersecurity threat application, activating additional applications, etc. In embodiments, the one or more data enrichment protocols can include accessing a website. The website can include a secure website. In embodiments, the accessing a website can enable additional information gathering for the threat.

Further embodiments can include generating a set of rules to enable the sorting, the integrating, the evaluating, and the generating. Various techniques can be applied to generating a set of rules. In embodiments, the set of rules can be determined using human input. The human input can be obtained for a cybersecurity profession, a panel of cybersecurity experts, and the like. In other embodiments, the set of rules can be determined using machine learning. The machine learning can be used to try a wide variety of response scenarios, to evaluate success or failure of a given scenario, to choose a "best" scenario, etc. In other embodiments, the set of rules can be determined using a combination of human input and machine learning.

Disclosed embodiments include a computer program product embodied in a non-transitory computer readable medium for cybersecurity management, the computer program product comprising code which causes one or more processors to perform operations of: accessing a plurality of network-connected cybersecurity threat protection applications; ingesting a plurality of heterogeneous log files, wherein the log files are generated by at least two of the plurality of cybersecurity threat protection applications; sorting each of the plurality of log files, wherein the sorting enables identification of cybersecurity threat protection elements among the plurality of log files; integrating the cybersecurity threat protection elements that were identified; evaluating the cybersecurity threat protection elements that were integrated; and generating at least one response for cybersecurity threat management, based on a result of the evaluating. Disclosed embodiments further include a computer system for cybersecurity comprising: a memory which stores instructions; one or more processors coupled to the memory wherein the one or more processors, when executing the instructions which are stored, are configured to: access a plurality of network-connected cybersecurity threat protection applications; ingest a plurality of heterogeneous log files, wherein the log files are generated by at least two of the plurality of cybersecurity threat protection applications; sort each of the plurality of log files, wherein the sorting enables identification of cybersecurity threat protection elements among the plurality of log files; integrate the cybersecurity threat protection elements that were identified; evaluate the cybersecurity threat protection elements that were integrated; and generate at least one response for cybersecurity threat management, based on a result of the evaluating.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited neither to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for cybersecurity management comprising:
   accessing a plurality of network-connected cybersecurity threat protection applications, wherein the cybersecurity threat protection application capabilities include endpoint protection, anti-phishing protection, antivirus protection, firewall protection, man-in-the-middle protection, denial of service protection, distributed denial of service protection, and ransomware protection;
   ingesting a plurality of heterogeneous log files, wherein the log files are generated by at least two of the plurality of cybersecurity threat protection applications;
   sorting each of the plurality of log files, wherein the sorting enables identification of cybersecurity threat protection elements among the plurality of log files;
   integrating the cybersecurity threat protection elements that were identified;
   evaluating the cybersecurity threat protection elements that were integrated; and
   generating at least one response for cybersecurity threat management, based on a result of the evaluating.

2. The method of claim 1 further comprising evaluating the plurality of heterogeneous log files that were ingested to enable identification of cybersecurity threat protection application capabilities.

3. The method of claim 1 wherein the response is provided to a cybersecurity threat management entity.

4. The method of claim 3 wherein the cybersecurity threat management entity is a cybersecurity professional.

5. The method of claim 3 wherein the cybersecurity threat management entity is a security orchestration automation and response (SOAR) application.

6. The method of claim 1 wherein the plurality of cybersecurity threat protection applications comprises security information and event management (SIEM) applications.

7. The method of claim 1 further comprising generating a set of rules to enable the sorting, the integrating, the evaluating, and the generating.

8. The method of claim 7 wherein the set of rules is determined using human input.

9. The method of claim 7 wherein the set of rules is determined using machine learning.

10. The method of claim 7 wherein the set of rules is determined using a combination of human input and machine learning.

11. The method of claim 1 wherein the ingesting is based on a query to the plurality of cybersecurity threat protection applications.

12. The method of claim 1 wherein the ingesting occurs on a regular time interval.

13. The method of claim 12 wherein the regular time interval is user configurable.

14. The method of claim 1 wherein the ingesting occurs on a cybersecurity threat protection application push basis.

15. The method of claim 1 wherein the accessing a plurality of cybersecurity threat protection applications is enabled by digitally providing credentials to the plurality of cybersecurity threat protection applications.

16. The method of claim 1 wherein the integrating the cybersecurity threat protection elements is controlled by integration configuration.

17. The method of claim 16 wherein the integration configuration is performed by a cybersecurity professional.

18. The method of claim 16 wherein the integration configuration is obtained from a configuration library.

19. The method of claim 16 wherein the integration configuration is learned through machine learning.

20. The method of claim 1 wherein the threat protection elements include non-cybersecurity, network-related elements.

21. The method of claim 20 wherein the non-cybersecurity, network-related elements include information technology (IT) tool output, network configuration data, cybersecurity threat protection application metadata, network-related metadata, network client physical location data, network client internet protocol (IP) identification data, and user entered data.

22. The method of claim 1 further comprising concentrating the plurality of heterogeneous log files by a security information and event management (SIEM) application.

23. A computer program product embodied in a non-transitory computer readable medium for cybersecurity management, the computer program product comprising code which causes one or more processors to perform operations of:
   accessing a plurality of network-connected cybersecurity threat protection applications, wherein the cybersecurity threat protection application capabilities include endpoint protection, anti-phishing protection, antivirus protection, firewall protection, man-in-the-middle protection, denial of service protection, distributed denial of service protection, and ransomware protection;
   ingesting a plurality of heterogeneous log files, wherein the log files are generated by at least two of the plurality of cybersecurity threat protection applications;
   sorting each of the plurality of log files, wherein the sorting enables identification of cybersecurity threat protection elements among the plurality of log files;
   integrating the cybersecurity threat protection elements that were identified;
   evaluating the cybersecurity threat protection elements that were integrated; and
   generating at least one response for cybersecurity threat management, based on a result of the evaluating.

24. The computer program product of claim 23, wherein the computer program product comprises code which causes the one or more processors to perform further operations of:
   evaluating the plurality of heterogeneous log files that were ingested to enable identification of cybersecurity threat protection application capabilities.

25. A computer system for cybersecurity comprising:
   a memory which stores instructions;
   one or more processors coupled to the memory, wherein the one or more processors, when executing the instructions which are stored, are configured to:

access a plurality of network-connected cybersecurity threat protection applications, wherein the cybersecurity threat protection application capabilities include endpoint protection, anti-phishing protection, antivirus protection, firewall protection, man-in-the-middle protection, denial of service protection, distributed denial of service protection, and ransomware protection;

ingest a plurality of heterogeneous log files, wherein the log files are generated by at least two of the plurality of cybersecurity threat protection applications;

sort each of the plurality of log files, wherein the sorting enables identification of cybersecurity threat protection elements among the plurality of log files;

integrate the cybersecurity threat protection elements that were identified;

evaluate the cybersecurity threat protection elements that were integrated; and generate at least one response for cybersecurity threat management, based on a result of the evaluating.

26. The computer system of claim 25, wherein the one or more processors, when executing the instructions which are stored, are further configured to:

evaluate the plurality of heterogeneous log files that were ingested to enable identification of cybersecurity threat protection application capabilities.

* * * * *